(12) United States Patent
Chincholle et al.

(10) Patent No.: US 7,365,741 B2
(45) Date of Patent: Apr. 29, 2008

(54) METHOD FOR NAVIGATION AND SELECTION AT A TERMINAL DEVICE

(75) Inventors: Didier Chincholle, Sollentuna (SE); Björn Jonsson, Saltsjöbaden (SE); Per-Olof Nerbrant, Österskär (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 791 days.

(21) Appl. No.: 10/488,623

(22) PCT Filed: Aug. 23, 2002

(86) PCT No.: PCT/SE02/01525

§ 371 (c)(1),
(2), (4) Date: Mar. 2, 2004

(87) PCT Pub. No.: WO03/025510

PCT Pub. Date: Mar. 27, 2003

(65) Prior Publication Data

US 2004/0233160 A1    Nov. 25, 2004

(30) Foreign Application Priority Data

Sep. 19, 2001    (SE) .................................... 0103151

(51) Int. Cl.
    *G09G 5/00*    (2006.01)
(52) U.S. Cl. ...................................... 345/169; 345/158
(58) Field of Classification Search ........ 345/156–176, 345/179, 503; 359/462, 463, 464, 465, 376; 348/50–59, 60
See application file for complete search history.

(56) References Cited

U.S. PATENT DOCUMENTS

| | | |
|---|---|---|
| 6,933,923 B2 * | 8/2005 | Feinstein .................... 345/158 |
| 2005/0154988 A1 * | 7/2005 | Proehl et al. ............... 715/720 |
| 2006/0061551 A1 * | 3/2006 | Fateh ......................... 345/158 |

FOREIGN PATENT DOCUMENTS

EP    1028366 A2    8/2000

* cited by examiner

*Primary Examiner*—Nitin I. Patel
(74) *Attorney, Agent, or Firm*—Thomas Bethee, Jr.

(57) ABSTRACT

A system and method for navigation and selection in an information space at least partly displayed on a display screen at a mobile terminal device. The information space contains selectable information objects properties. The terminal device has motion-sensing means for control of the displayed information and of object selection. An information object may represent an information space whereby object properties determine display, navigation, and selection characteristics. In particular, a terminal device motion along a predefined axis affects a type of projection for mapping the information onto a display screen and, simultaneously, a scale factor.

14 Claims, 9 Drawing Sheets

METHOD FOR NAVIGATION AND SELECTION AT A TERMINAL DEVICE

BACKGROUND OF THE INVENTION

1. Technical Field of the Invention

The present invention relates generally to method and means for navigation and selection of information at a terminal device having a display that can display only part of the complete information.

2. Background of the Invention

There is a rapid increase of the use of portable tools such as mobile telephones, personal digital assistants (PDA), electronic notebooks, hand held computers, and other electronic hand held devices. It is common that a user of such a device may select from a range of selectable applications like calendar and address book. Usually, these applications have been implemented locally at the terminal device having processing and storage means for execution of application software. The necessary steps to locate and run an application have been quite simple and usually involve browsing through a few simple text menus. However, the development of wireless technologies, e.g. GPRS (General Packet Radio System) and broadband wireless technologies like UMTS (Universal Mobile Telecommunications System) allows a user to access complex applications provided through access to a data network node. The range of applications increases drastically and the problem of navigation and selection becomes an essential topic in the design of intuitive and effective user interfaces. To start an application a user is normally required to operate various controls for navigation and selection of an object that represents the application. A control may, e.g., be implemented as a button, a joystick, a thumb-wheel, a pointing device. Usually such controls affect a type of cursor that can be moved to any displayed selectable object. The selected object is then executed by operating another control. A problem with commonly known methods for control of hand held terminal devices is that they are not intuitive, require several operative steps to accomplish a task, and often require the use of two hands for manipulation of the device whereas a user would prefer using one hand only.

When using services provided through a network node a sophisticated navigation may be required to locate and select an object representing a desired function. For example, the Internet provides a user with an enormous amount of linked information of which only a small part may be displayed at one time on the small display of a mobile device. Each displayed screen image may, further, contain selectable objects representing different functions or applications. It would be advantageous if a user could obtain a gross overview of the information facilitating the location of a relevant sub-domain and to expand this sub-domain in more detail. It is known that a user may sometimes be able to change the scale, e.g. font size, to obtain a better overview of the complete information. However, changing scale usually requires additional control operations e.g. activation of a scale menu and selection of a scale factor.

It is further noticed that the enormous amount of information provided e.g. on Internet or an Intranet varies extensively in type including ordinary text, graphics, images, and audio. Whereas, previously, methods and means for navigation have usually been designed with text information in mind, it would be advantageous to represent a type of information in a way that is intuitive to a user. For example, a geographical map is intuitively understood as a planar projection of a spherical surface. It is well known in the art to select a map projection adapted to specific purposes. Similarly, the book paradigm is intuitive when dealing with text information i.e. to divide the text on several pages that lay on top of each other such that a specific page can be reached by turning pages. Technologies for 3D representations may become possible on mobile devices. Much effort has been made to obtain intuitive representations of 3D computerized objects. Intuitively, a user may like to travel in any direction in a 3D world to locate and watch 3D objects from all sides. It may, thus, be advantageous to conveniently represent the information to be studied depending on type of information and user context.

There is, thus, a need for a method and arrangement facilitating navigation and selection among large amounts of information at a terminal device with a display screen that can display only part of the complete information.

DESCRIPTION OF RELATED ART

European patent application EP 1 028 366 A2 (Fahteh S et al) discloses a method for motion driven access to object viewers. By tracking the movements of a display device the user is able to traverse the information content mapped to a virtual desktop. Additionally, in response to a command entered by the user, the invention virtually magnifies the displayed information. By moving the device in the direction the user is interested in, the user is allowed to traverse a two-dimensional object that is much larger than the display. By moving the device along a virtual z-axis, the user may zoom to a closer view of the displayed information. Fateh is generally concerned with geographical information, i.e. map information. By a zooming operation further details of a certain map region are obtained. However, the same type of map projection is maintained throughout all navigation. The geographical information according to Fateh may be considered to represent one information object that comprises a plurality of information units. Depending on a variable zoom factor information units of a minimal size are displayed. However, an information unit, according to Fateh, does not represent a selectable object having its own internal characteristics and that, e.g., can be associated with a new plurality of information units. It is further noticed that the type of projection used in displaying information, according to Fateh, is the same throughout the navigation.

It would, therefore, be an advantage to improve the method of Fateh for navigating among a plurality of information units in that at least some information units are represented as independent selectable information objects that can be displayed in dependence of its object properties.

SUMMARY OF INVENTION

The present invention addresses the aforementioned problems by providing methods and means for improved interaction with an information space comprising a plurality of information units at least some of which represent independent information objects that have object properties.

According to the invention navigation and selection of objects are performed using a sensing device at a mobile device whereby object properties determine object behavior at the above mentioned operations.

An object of the present invention is to provide methods for displaying information, associated with an information object, using a type of projection in dependence of object properties.

Another object of the present invention is to provide a navigation mode and a selection mode. In the navigation mode the invention provides methods and means for navigation through an extensive information space of which, at each instance, only part can be displayed on a display screen. In the selection mode the invention provides methods and means for locating and selecting, in the information part currently displayed, a selectable object.

In a preferred embodiment motion sensing devices are used together with terminal controls, e.g. buttons, to affect control in the navigation and selection modes. In particular, when the terminal device is switched on the display shows only a part of an information space comprising selectable objects. By activating a first terminal control, the terminal device goes into the navigation mode and current values, as indicated by the motion sensing devices, are recorded as a terminal device reference position. Subsequent terminal device motions are measured relatively the reference position. If the information extends beyond the limits of the display, the user may move the device to change the information part displayed. The movement may consist of a parallel displacement of the terminal or a rotation. By inactivation of the terminal control the currently displayed screen is locked and movements of the terminal will thereafter not affect the displayed information. A new reference position is recorded the next time the navigation mode is activated.

In the preferred embodiment of the invention there is a selection area marked on the display e.g. as a shadowed circle. A selectable object, desired for selection, is moved over the selection area, by navigation maneuvers, to overlap at least partly with the selection area. An object overlapping with the selection area is marked. By operating a second terminal control a user may obtain further information about the marked object or select the object. It is noted that the type of projection used to display a selected information object may depend on object properties. It is an object of the present invention to relate a type of projection to terminal movements, in particular movements along a defined z-axis.

A system and method as specified in the appended claims obtain the objectives set out for the present invention. Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF DRAWINGS

A more complete understanding of the system and method of the present invention may be obtained by reference to the following Detailed Description when taken in conjunction with the accompanying drawings, which are given by way of illustration only, and thus do not limit the scope of the present invention and wherein.

DETAILED DESCRIPTION OF PREFERRED EMBODIMENT

Figure 1:
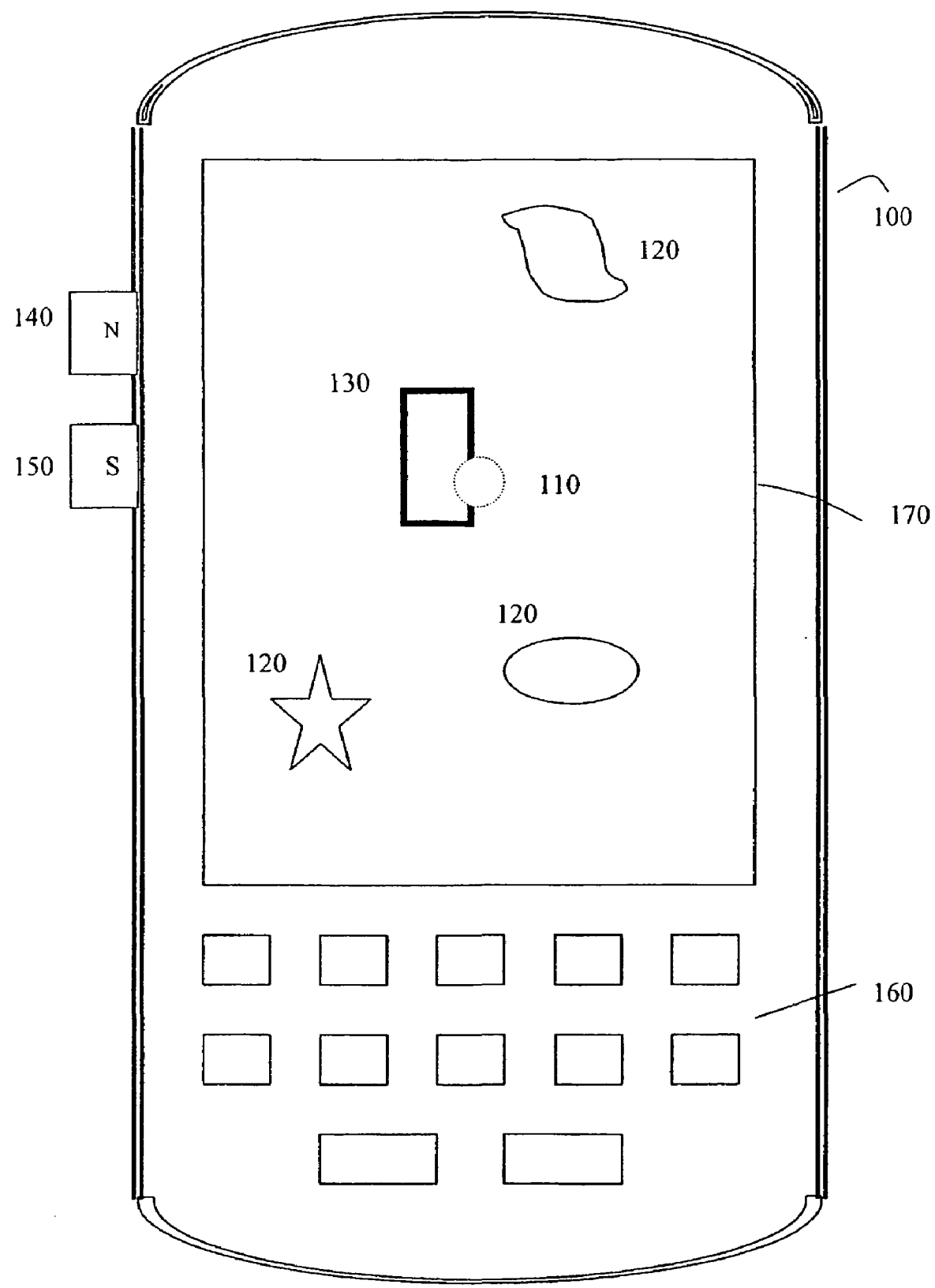
FIG. 1 is an exemplary schematic illustration of a terminal device displaying objects, a selection area and controls.

FIG. 1 illustrates, by example, a cellular telephone 100 implementing the inventive method and means for navigation and selection. The cellular phone has a display device 170 and two controls for navigation 140(N) and selection 150(S) respectively. The display device has a selection area 110. Displayed objects 120, 130 are shown by way of example. One object 130 represents a list object and has been moved to overlap with the selection area 110. This object, therefore, has been marked, e.g. by a thick borderline. In this status of the display, a user may operate the selection button 150(S) to select the object 130. Depending on object properties the selection may result in the display of a new information space or activation of a certain terminal function associated with the selected object.

Figure 6:
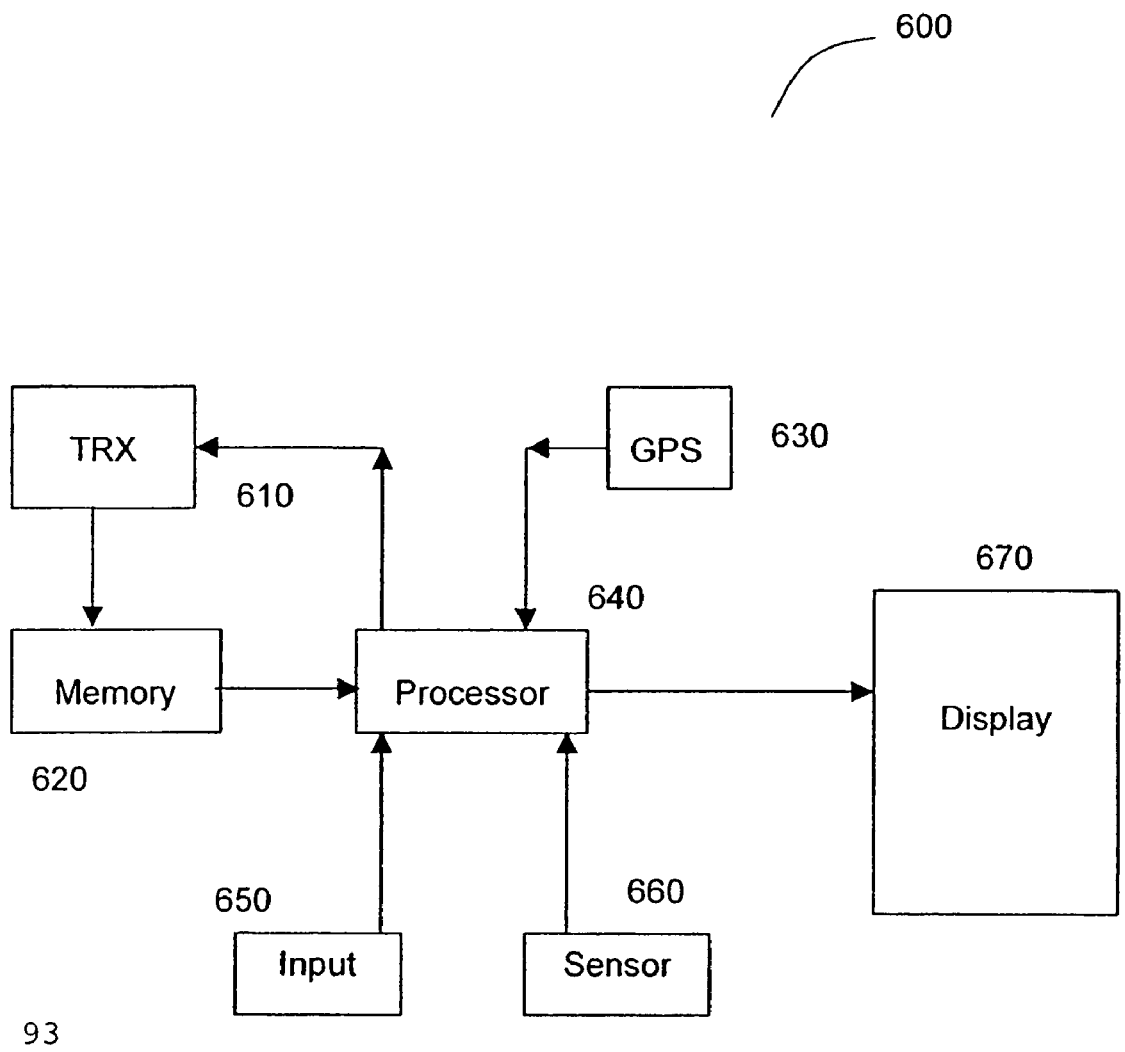
FIG. 6 illustrates a schematic diagram of a terminal device.

A terminal device according to one preferred embodiment of the present invention is illustrated in FIG. 6 and relates to a cellular telephone with a display device 670, a sensing device 660, processing means 640 and storage means 620, and input means 650 shown as buttons in the illustrated embodiment. Further, the device may include a transceiver 610 for communication over a wireless network and a receiver 630 for reception of position information, e.g. a GPS receiver. Other examples of means for positioning include means for triangulation e.g. located at base stations in a cellular system, and means for measuring terminal device position with respect to a reference surface.

The memory 620 may contain at least part of an information space. If memory 620 does not have capacity to store the complete information space, required parts may be downloaded, e.g. over an air interface, to replace parts not required at a particular moment. For each object stored in memory 620 there is an associated properties file. The properties file may include information about a type of projection for mapping the information space for display on a display screen and characteristics of a selection area. By activating control 140(N) the input unit 650 generates a control signal instructing the processing unit 640 to record current sensor values indicated by unit 660 as a reference position relative to which terminal device motions are subsequently measured.

Figure 9:
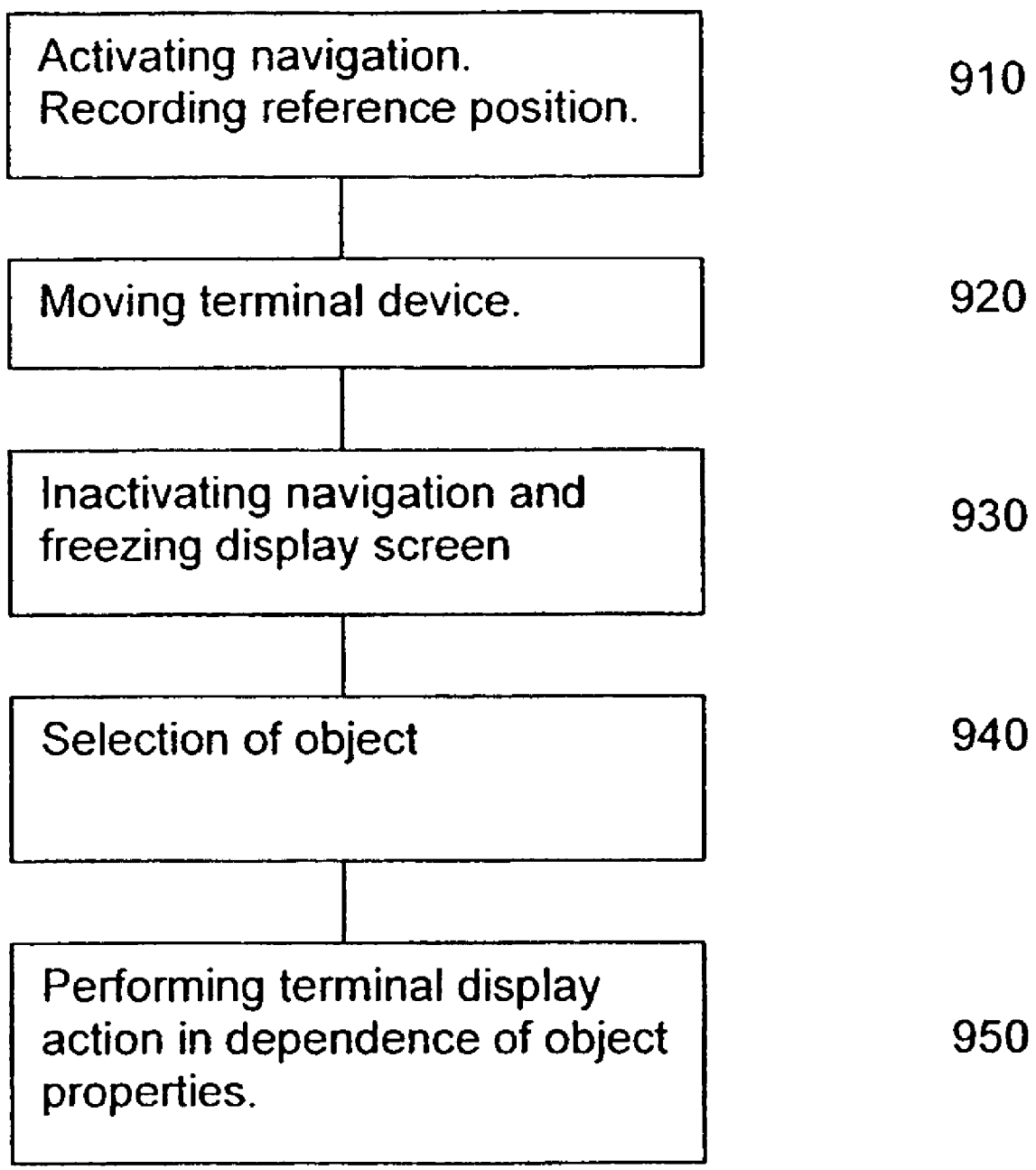
FIG. 9 is a flow chart showing steps when operating a terminal device according to the invention.

The operation of a cellular phone according to a preferred embodiment will now be described in detail with reference to FIG. 9 in which a flow chart is illustrated.

At 910 the navigation mode is activated, e.g. by pressing button 140(N) and keeping it pressed. Included in this step is a recording of the current motion sensor values as a reference position of the cellular phone.

At 920 the terminal is moved relative to the reference position whereby the displayed part of the information space is changed such that an object 130 for selection is overlapping with the selection area 110 and marked for selection.

At 930 the navigation control 140(N) is inactivated whereby the current display is locked and made insensitive to further motion of the terminal device.

In step 940 the selection control 150 is activated whereby selection is effectuated of the marked object.

At 950 new information is displayed in dependence of object properties of the selected object. Step 910 may now be repeated to continue navigation in the new information space.

Figure 3:
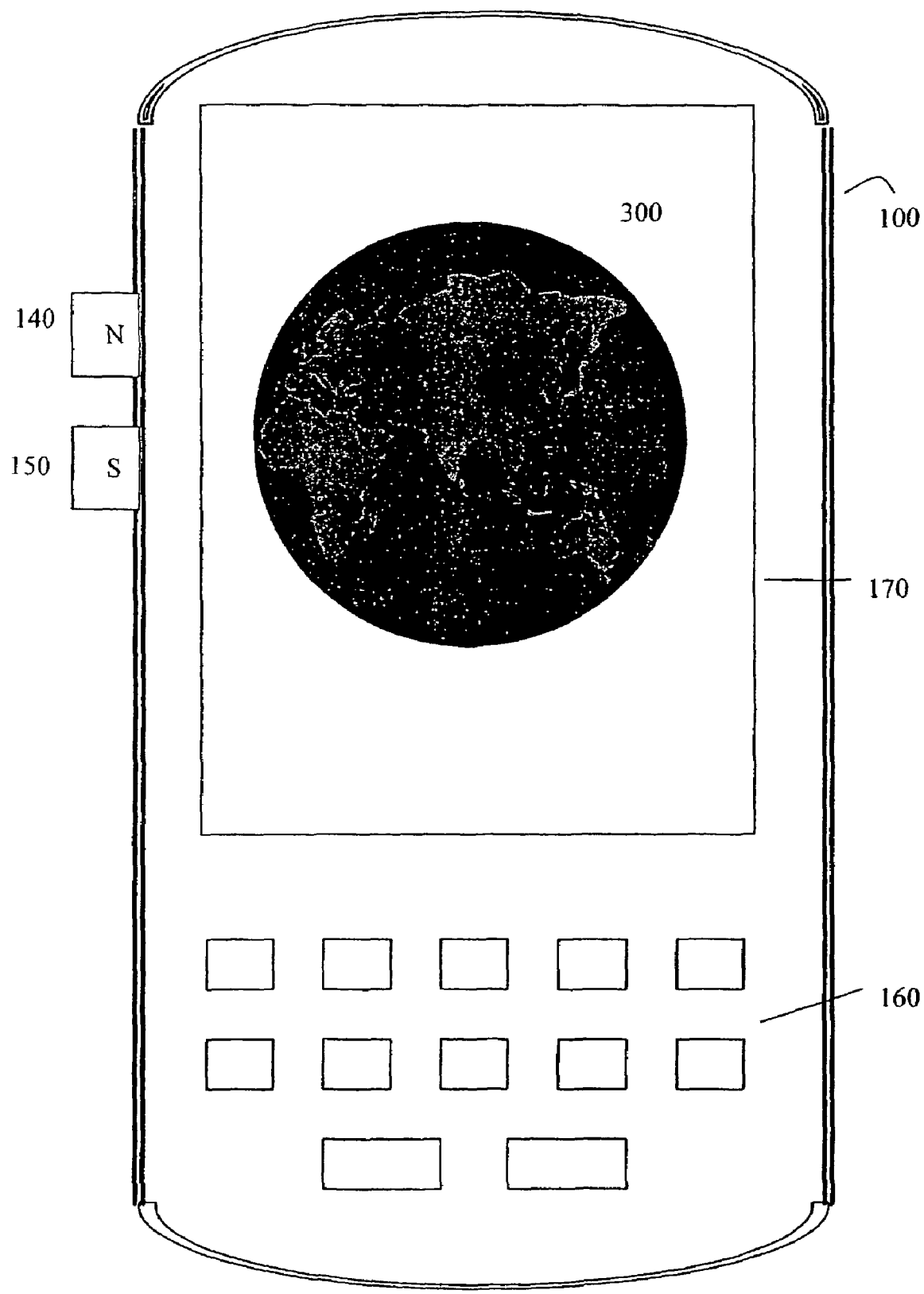
FIG. 3 is still another example of a displayed object that represents a sphere.
Figure 4:
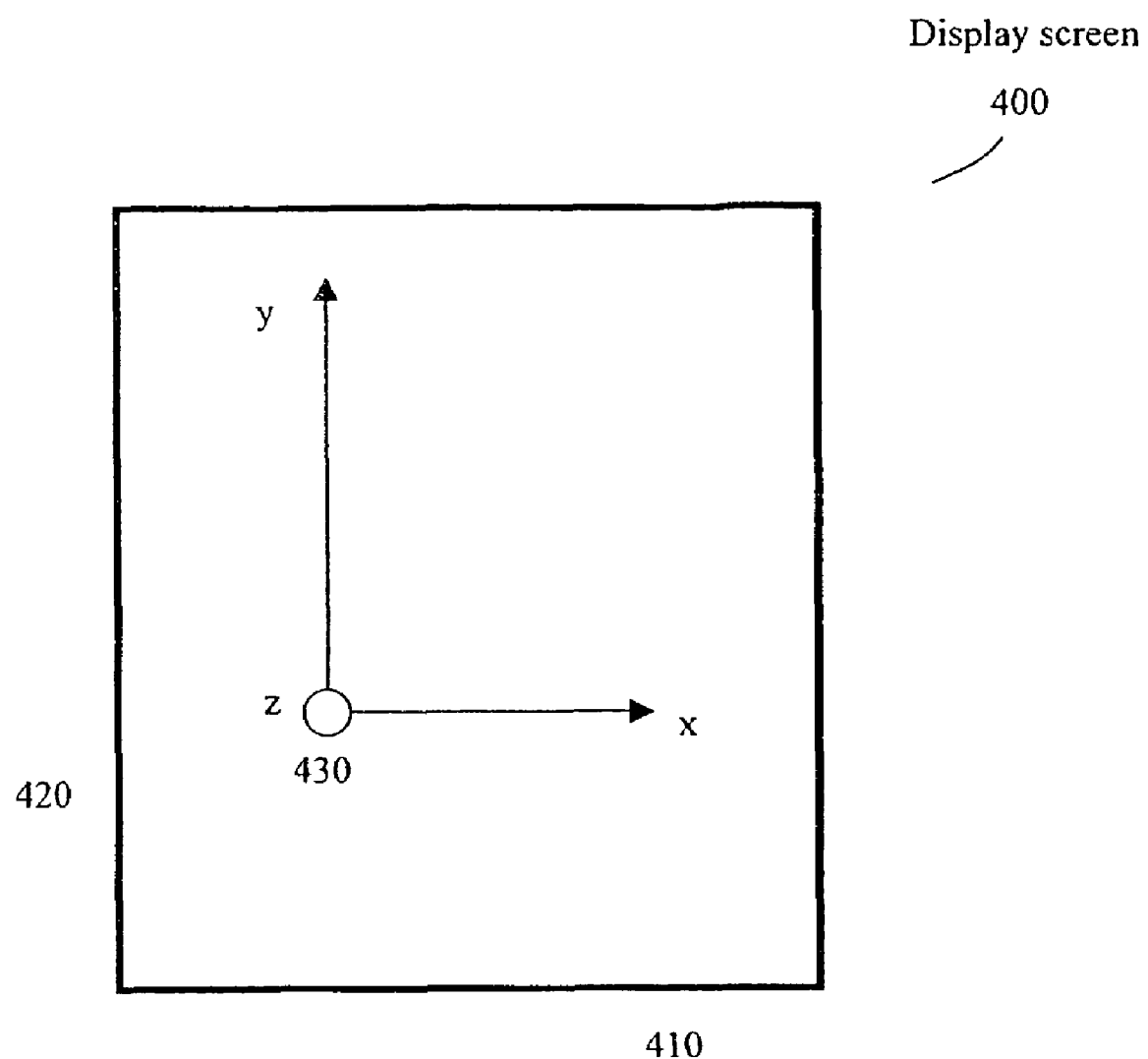
FIG. 4 illustrates the arrangement of a coordinate system at a terminal device.

FIG. 3 illustrates the case of selection of an object representing a geographical information space. At 300 there is a projection of a terrestrial globe. The properties of this object allows a user to turn the globe to display different parts and, further, to zoom in the globe to obtain further details of the displayed part. In order to define movements of the cellular device, a coordinate system is introduced as illustrated in FIG. 4. Exemplary x- and y- axes may be introduced along the sides 410, 420 of a rectangular display screen 400 and a z-axis 430 perpendicular to the display screen. Rotation movements around any axis are translated into corresponding rotations of the globe. The selection area 110 may be located at the origin of the coordinate system. A translation movement in the negative z-direction results in zooming into the area centered at the origin.

Description of Alternative Embodiments

Figure 7:
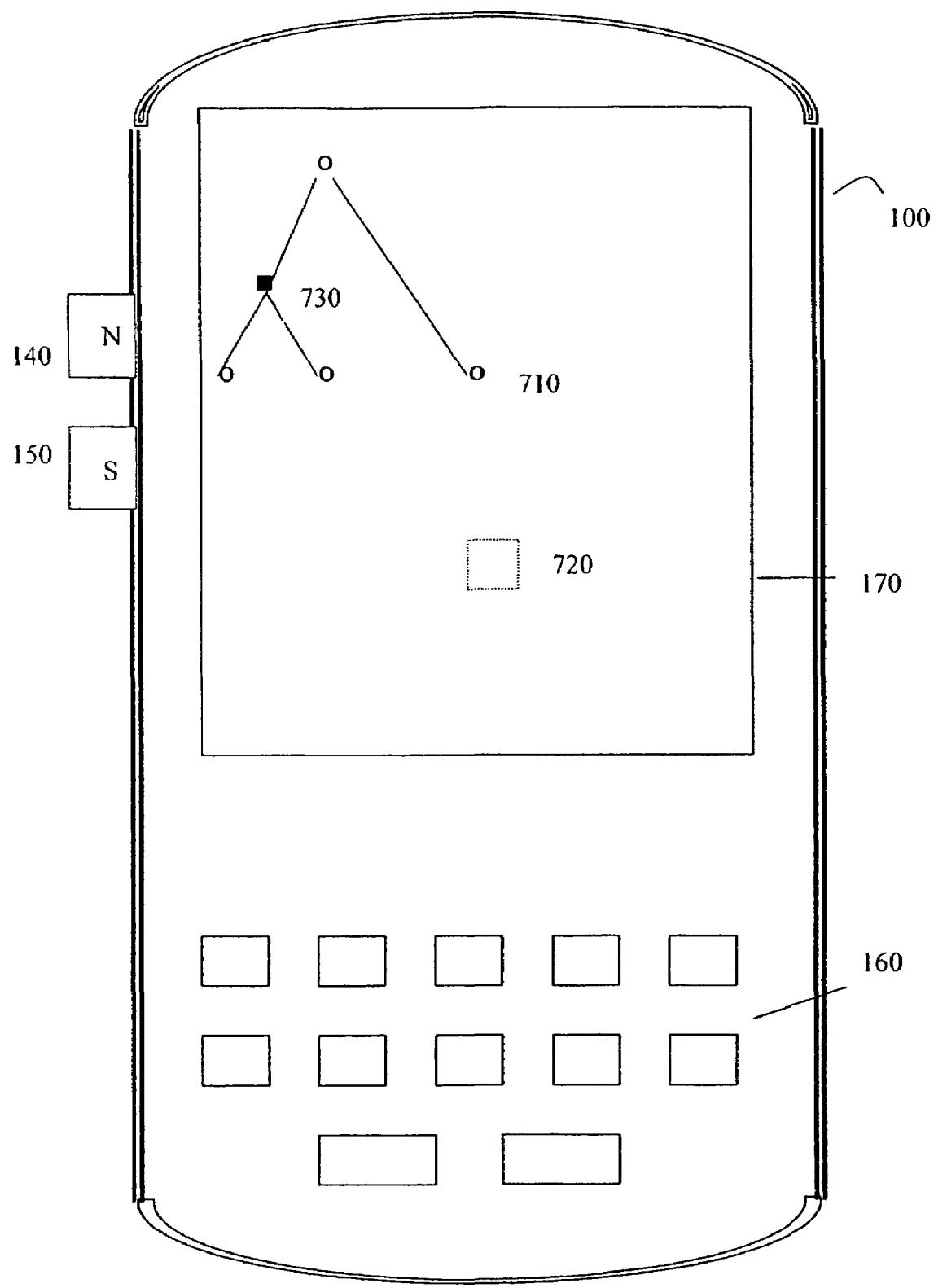
FIG. 7 illustrates a display related to a special navigation mode.

In one embodiment of the invention each of the controls 140 and 150 has two modes. Thus, by activating the control 150(S) for a time duration exceeding a predefined time further information is displayed related to an object marked for selection. The information is cancelled when control 150(S) is deactivated. According to this embodiment, a user selects a marked object by activating control 150(S) for time duration less than a predefined time. Similarly, according to this embodiment, activation of control 140(N) for time duration exceeding a predefined time sets the cellular device in navigation mode. Activation of control 140(N) for time duration less than a predefined time sets the cellular device in a special navigation mode as illustrated in FIG. 7. The special navigation mode allows navigation through a collection of saved screens. For example, at each selection of an object the display screen from which the selection was made could be saved in memory means 620 capable of storing a predefined number of display screens. FIG. 7 shows a tree of connected symbols 710 each representing a display screen. At 720 a navigation symbol is shown that can be placed over any desired symbol 710 by moving the device. As described above, information about any marked symbol 710 may be obtained, e.g. a short description of the corresponding screen. A selection operation at a marked symbol 710 recovers the corresponding screen display. The symbol at 730 in FIG. 7 is specially marked to show the location of the last page that the user was displaying when entering into the special navigation mode.

Figure 2:
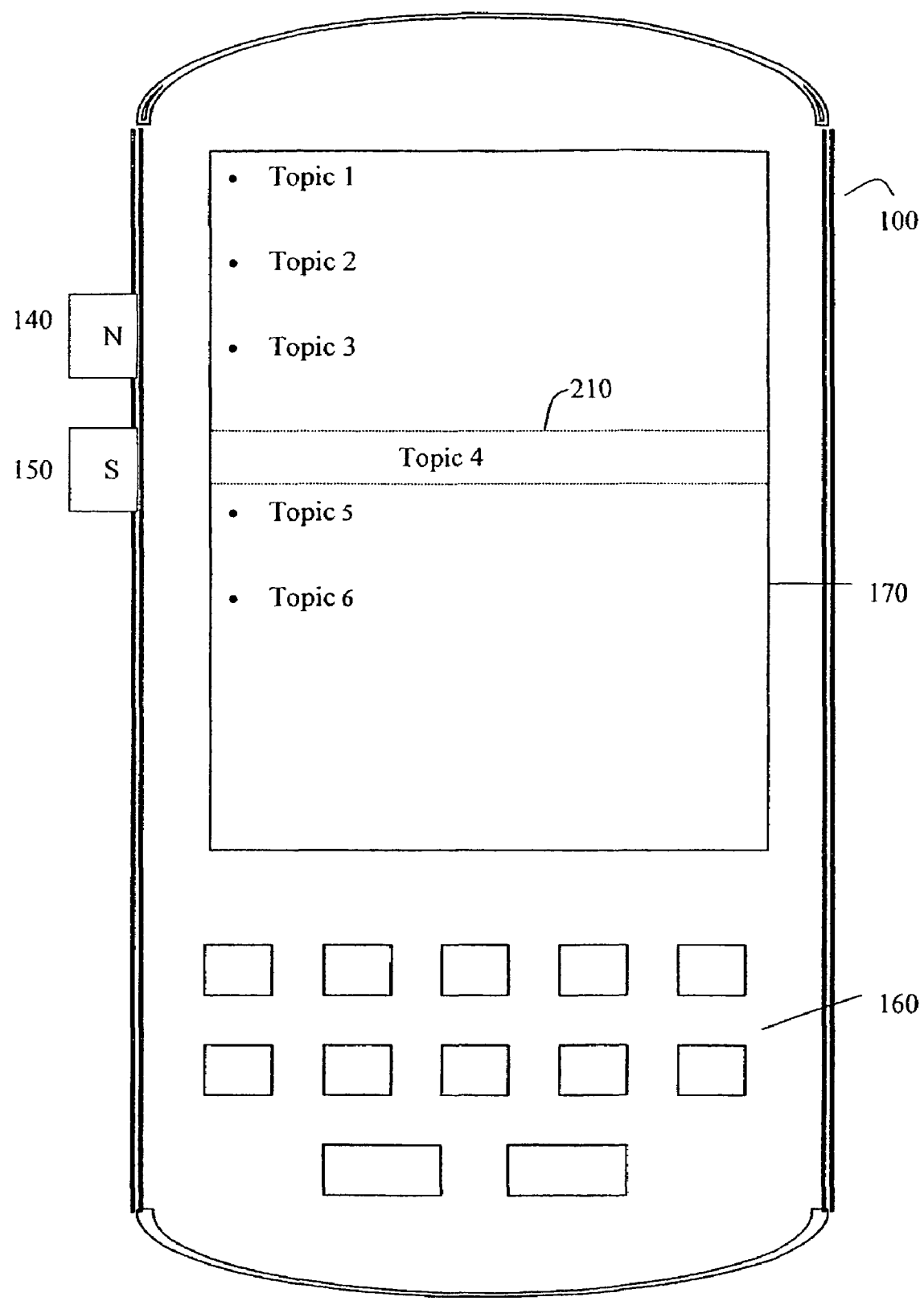
FIG. 2 is another illustration of a displayed object being a list type object.

In one embodiment of the invention the selection area 130 is an object property. More specifically, upon selection of an object, e.g. object 130, a new display screen is obtained including a selection area 110 of size, form and other characteristics associated with the selected object 130. Exemplary, FIG. 2 illustrates the information space obtained by selecting an object 130 representing a list of selectable topics. The selection area 110 in the example illustrated in FIG. 2, comprises an area 210 in the form of a selection bar. By activating control 140(N), a user may navigate such as to position a desired topic over the selection bar and mark it for selection. As described above, activating control 150(S) for time duration exceeding a predefined time result in the display of information related to the marked topic. Deactivating control 150(S) and activating it again for time period less than a predefined time effectuates selection of the marked topic.

Figure 5:
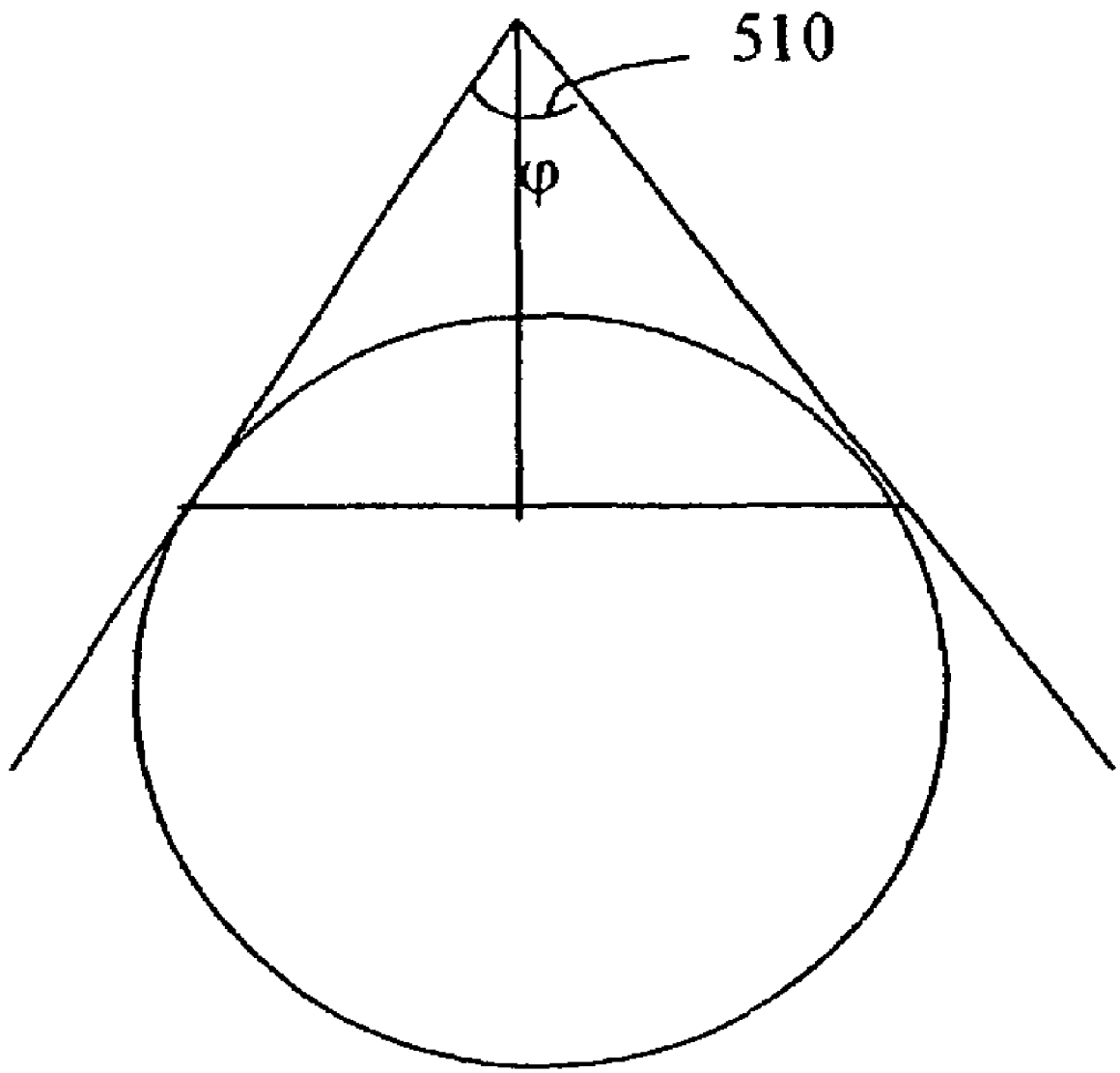
FIG. 5 is a schematic diagram of the principle for conical projection.
Figure 8:
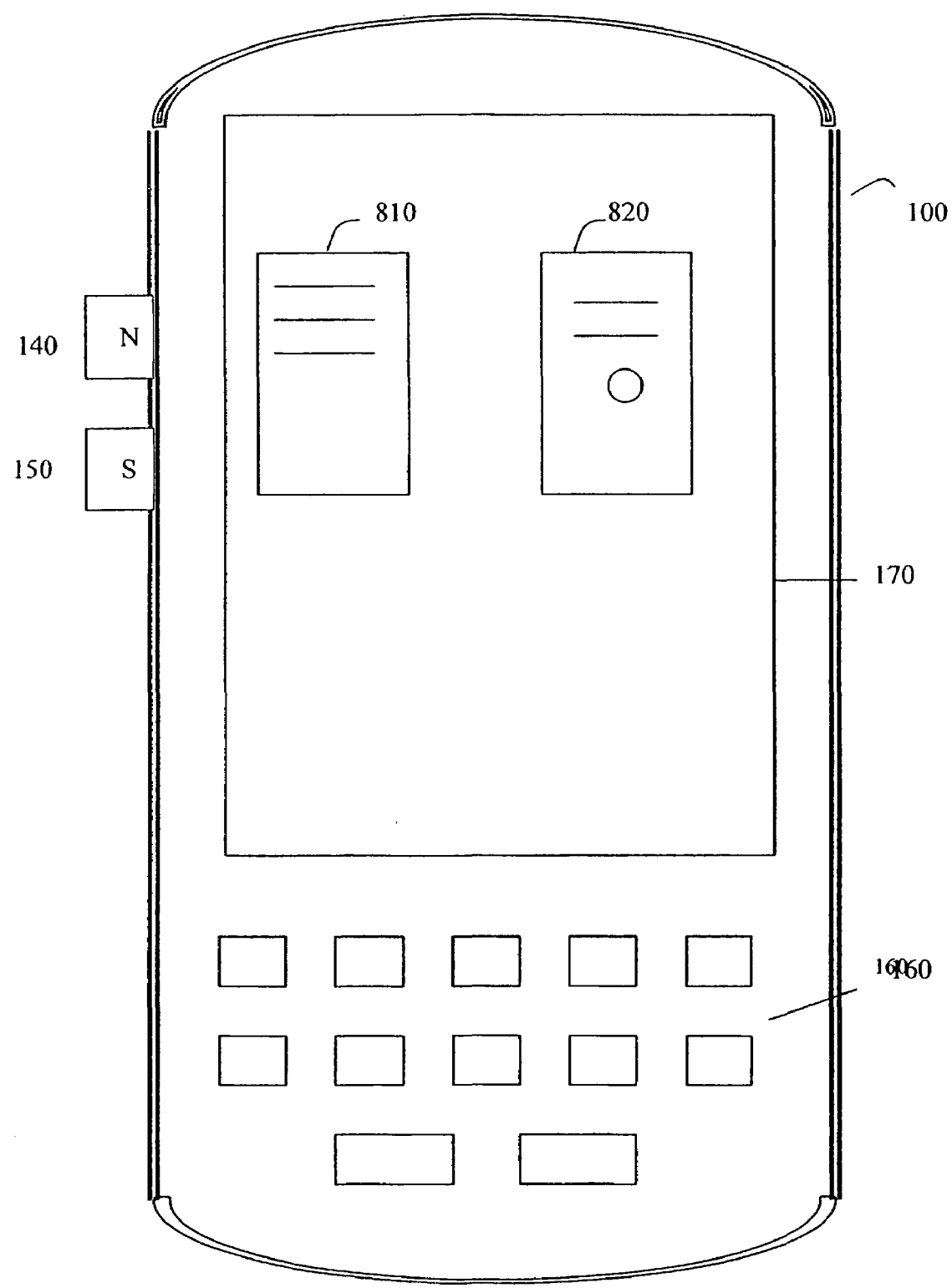
FIG. 8 illustrates an example of a displayed object that represents a textbook for reading.

In one embodiment of the invention the projection of an object representing information on a spherical surface is a conical map projection as illustrated in FIG. 5. In particular, a user may, according to this embodiment, move the device along a z-direction 430 thereby relating, in a continuous manner, scale and an angle $\phi$ at 510 defining type of conical projection. A user may accordingly vary the view from a gross overview of the object ($\phi=\pi/2$) displayed as an azimuth circular projection of the object to a cylindrical projection ($\phi=0$) providing a detailed display of a small part of the sphere. According to this embodiment, the scale changes in the zooming operation inversely proportional to the relative displacement along the negative z-axis such that a smaller scale (i.e. more details) is obtained as the device is moved "towards" the object. Thus, let $\Delta z$ be the displacement along the negative z-direction as measured from a reference position. At first when an object is selected $\Delta z=0$. Next Cos $\phi$ varies in accordance with Cos $\phi=f(\Delta z)$ where $f$ is a monotonously increasing function such that $f(0)=0$ and $f(\infty)=1$. Thus, by moving the cellular device in the negative z-direction the projection angle $\phi$ varies correspondingly. Let further M designate a map scale. The scale may, e.g., relate to area or distance. Then $M=\theta(\Delta z)$ where the function $\theta$ is such that $\theta(0)$ corresponds to a scale factor $M_0$ such that the circular projection of the globe, e.g. as shown in FIG. 3, fits neatly into the display screen. The projection described above is particularly useful when the information comprises a map or a complex schema. In another example an object represents a textbook. Navigating the screen to place the book object icon to overlap with the selection area allows a selection operation to be performed whereby, e.g., a contents list is displayed. The user may select a particular chapter whereby the pages of the selected chapter are displayed on a planar projection, each page occupying an equal page object area depending on a magnification factor e.g. as shown in FIG. 8. In FIG. 8 the page layout of pages 810 and 820 has been illustrated. Navigation may be performed as described earlier and a particular page may be zoomed and presented in readable form on the display screen. A page property may be used to obtain different reading modes. Exemplary, in one mode, the text may not expand beyond the right limit of the screen regardless of the degree of zooming. A downward scrolling may be required in this case to browse the complete text. In another mode the text may be presented in the RSVP form (Rapid Serial Visual Presentation). Thus, when zooming into a page having this property, a reading window will appear displaying one line of text including a few words according to the RSVP procedure.

From the two embodiments thus described it follows that a zoom operation may affect the type of projection used to display a certain object.

In still another embodiment, the device has access to a communication device for wireless communication with an external storage. It is evident, that certain information will require large amounts of storage capacity and powerful processing means. In this embodiment, therefore, the device connects to an external entity if navigation is performed outside the range corresponding to locally stored information. New information may then be downloaded to the device and replace information not currently being used. The external entity may also perform calculations required, for example, by a particular complex projection used by the object. In this embodiment, therefore, a displacement vector obtained from the motion sensing device is transmitted to the external entity together with information relating to the current display view thereby enabling the external entity to carry out the necessary operations to download new information according to the appropriate type of projection.

In still another embodiment, an object property relates to a dependence on the geographical location of the device. The location of the device may be obtained from a GPS system. A useful property of the current invention can then be utilized to provide a user with powerful means for navigation at the place of location. It is assumed that a map is available at the location of the user providing information about objects of a certain minimum size in any direction not further away than e.g. 50 meters. The map may be downloaded over an air interface from a remote server and is presented having its N-S direction e.g. along the y-axis in FIG. 4. If the device has compass means a user, holding the device tight, may turn around such that the N-S direction of the map corresponds to the real N-S direction. This position of the device is then saved as a reference position by entering the navigation mode. By turning around the z-axis the user now obtains a view in any desired direction. By a zooming operation the user may obtain information about objects in the surrounding located in a selected direction. The information may be provided in the form of a text description of the object and an image. Any such displayed object information may be selected for further detailed information either obtained from the same map or otherwise e.g. by connecting to an information node.

Although a geographical map of earth is particularly well suited for the described method other types of information may use the same method. For example, an electronic schema may be projected onto a spherical surface and the described method may be used to navigate the schemata.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for navigation and selection of information, said device comprising:
    a display for displaying information;
    memory means for storing information,
    means for loading the memory means with an information part representable as a displayed at least one information object;
    means for controlling, by a first motions of the device relative a reference position, the displayed representation of the at least one information object in dependence thereto associated object properties;
    means for determining a displayed selection tool the type of which depends on the properties of the at least one information object; and
    selecting an information object by second motions of the device causing an object and the selection tool to overlap at least partly;
    means for establishing communication with a remote information source in response to a motion of the terminal corresponding to information outside the current range of loaded information;
    means at the remote information source for preparing a download file in dependence of information provided in said communication relating to motion parameters and a type of projection; and
    means for downloading the download file to the device.

2. A device for navigation and selection of information, said device comprising:
    a display for displaying information;
    memory means for storing information,
    means for loading the memory means with an information part representable as a displayed at least one information object;
    means for controlling, by a first motions of the device relative a reference position, the displayed representation of the at least one information object in dependence thereto associated object properties;
    means for determining a displayed selection tool the type of which depends on the properties of the at least one information object; and
    selecting an information object by second motions of the device causing an object and the selection tool to overlap at least partly.

3. The device according to claim 2 wherein said means for controlling affects parameters corresponding to degrees of freedom of the at least one information object.

4. The device according to claim 2 wherein the at least one information object is operable as a sphere displayed as a conical projection and said means for controlling causes a simultaneous variation of an angle $\phi$ and a magnification factor.

5. A method for navigation and selection of information at a terminal device, the method comprising the steps of:
    loading a memory means of the device with an information part representable as a displayed at least one information object
    varying, by first motions of the device relative to a reference position, the representation of the displayed at least one information object in dependence of thereto associated object properties;
    determining a displayed selection tool, wherein the type of the displayed selection tool depends on the object properties of the at least one information object; and
    selecting an information object by second motions of the device.

6. The method of claim 1 wherein said first motions relate to a number of degrees of freedom characterizing the at least one information object.

7. The method of claim 1 wherein said representation of at least one information object corresponds to a sphere displayed as a conical projection of the sphere.

8. The method of claim 7 wherein moving the device along a predefined z-axis causes a variation of the type of projection corresponding to a variation of an angle $\phi$ and a simultaneous variation of a magnification property of the sphere.

9. The method of claim 8 wherein moving the terminal device along said z-axis in a direction towards the sphere a limiting value $\phi=0$, corresponding to a cylindrical projection and a limiting maximum magnification are simultaneously approached.

10. The method of claim 7 wherein an initial projection is a planar projection corresponding to $\phi=\pi/2$ and the magnification is such that the planar projection lies within the physical limits of the display screen.

11. The method of claim 1 wherein said displayed at least one information object represents a book for reading comprising a plurality of pages of information and said controlling corresponds to either turning book pages or zooming a book page.

12. The method of claim 11 wherein a continued zooming of the book page comprises the step of reaching a limit value that causes the type of representation to change to an RSVP format.

13. A method for navigation and selection of information at a terminal device, the method comprising the steps of:

loading a memory means of the device with an information part representable as a displayed at least one information object controlling, by first motions of the device relative to a reference position, the representation of the displayed at least one information object in dependence of thereto associated object properties, wherein said step of controlling by first motions involves the additional steps of:

establishing, in response to a motion of the terminal device corresponding to information outside the current range of loaded information and prior to said step of loading, communication with a remote information source and transferring from the terminal device motion parameters and a type of projection;

preparing, at said information source, a download file in dependence of the motion parameters and a type of projection;

downloading the download file to the device; and displaying at least part thereof according to said type of projection;

determining a displayed selection tool, wherein the type of the displayed selection tool depends on the object properties of the at least one information obiect; and selecting an information obiect by second motions of the device.

14. The method according to claim 13 wherein said step of loading is performed in dependence of the geographical position of the device and comprises the further steps of:

calibrating the device in a North-South direction;

directing the device in a certain direction and displaying information objects representative of physical objects and their relative distance along a line in the certain direction; and performing a zooming operation along the certain direction for selection of a desired one of said information objects.

* * * * *